US008102959B2

(12) United States Patent
Alderson et al.

(10) Patent No.: US 8,102,959 B2
(45) Date of Patent: Jan. 24, 2012

(54) DIGITAL AUDIO PROCESSING SYSTEM AND METHOD

(75) Inventors: Jeffrey Donald Alderson, Austin, TX (US); Darrell Tinker, Austin, TX (US); K. Gozie Ifesinachukwu, Austin, TX (US)

(73) Assignee: Sigmatel, Inc., Austin, TX (US)

(*) Notice: Subject to any disclaimer, the term of this patent is extended or adjusted under 35 U.S.C. 154(b) by 0 days.

(21) Appl. No.: 13/092,616

(22) Filed: Apr. 22, 2011

(65) Prior Publication Data

US 2011/0194661 A1 Aug. 11, 2011

Related U.S. Application Data

(62) Division of application No. 12/895,170, filed on Sep. 30, 2010, now Pat. No. 7,953,196, which is a division of application No. 11/641,564, filed on Dec. 19, 2006, now Pat. No. 7,831,001.

(51) Int. Cl.
*H04L 7/00* (2006.01)

(52) U.S. Cl. ........................... 375/355; 341/61; 341/123

(58) Field of Classification Search .................. 375/316, 375/344, 355, 377; 341/61, 122, 123, 126
See application file for complete search history.

(56) References Cited

U.S. PATENT DOCUMENTS

| | | | | |
|---|---|---|---|---|
| 5,185,609 | A | 2/1993 | DeBord | |
| 5,915,028 | A | 6/1999 | Chahabadi | |
| 6,175,269 | B1 | 1/2001 | Gielis et al. | |
| 6,184,942 | B1 | 2/2001 | Patel et al. | |
| 6,208,671 | B1 | 3/2001 | Paulos et al. | |
| 6,211,924 | B1 | 4/2001 | Patel et al. | |
| 6,333,767 | B1 | 12/2001 | Patel et al. | |
| 6,480,233 | B1 | 11/2002 | Limberg | |
| 6,512,555 | B1 | 1/2003 | Patel et al. | |
| 6,523,147 | B1 | 2/2003 | Kroeger et al. | |
| 6,526,101 | B1 | 2/2003 | Patel | |
| 6,694,026 | B1 | 2/2004 | Green | |
| RE38,456 | E | 3/2004 | Patel et al. | |
| 6,700,936 | B1 | 3/2004 | Moss | |
| 6,724,738 | B1 * | 4/2004 | Storm et al. | 370/320 |
| 6,738,610 | B1 | 5/2004 | Wildhagen | |
| 7,071,773 | B2 | 7/2006 | Kuhn et al. | |
| 7,489,731 | B2 * | 2/2009 | Coulson et al. | 375/260 |
| 2001/0040930 | A1 | 11/2001 | Abbey | |
| 2006/0017498 | A1 | 1/2006 | Kuhn et al. | |
| 2006/0077300 | A1 | 4/2006 | Cheon et al. | |

* cited by examiner

*Primary Examiner* — Dac V Ha
(74) *Attorney, Agent, or Firm* — Toler Law Group

(57) ABSTRACT

A digital audio processing system includes an input to receive a phase component of a signal. The digital audio processing system includes symbol recognition logic to adjust a sample of the phase component using an offset value. The symbol recognition logic maps the adjusted sample to a nearest predetermined phase value of a plurality of predetermined phase values. The symbol recognition logic determines a symbol using a difference between the nearest predetermined phase value and a prior nearest predetermined phase value. The prior nearest predetermined phase value corresponds to a prior sample of the phase component of the signal. The offset value is based on a detected error of the prior sample of the phase component of the signal. The digital audio processing system also includes an output to provide a second signal that indicates the symbol.

20 Claims, 7 Drawing Sheets

700

| Sample Number (702) | Phase (Degrees) (704) | Adjusted Phase (Degrees) (706) | Nearest Predetermined Phase Value (Degrees) (708) | Actual Phase Difference (Degrees) (710) | Phase Difference Indicated By Symbol (Degrees) (712) |
|---|---|---|---|---|---|
| 1 | 0 | | | | |
| 2 | 0 | 0 | 0 | 0 | 0 |
| 3 | 0 | 0 | 0 | 0 | 0 |
| 4 | 0 | 0 | 0 | 0 | 0 |
| 5 | 0 | 0 | 0 | 0 | 0 |
| 6 | 0 | 0 | 0 | 0 | 0 |
| 7 | 30 | 30 | 0 | 30 | 0 |
| 8 | 60 | 56 | 90 | 30 | 90 |

714 (samples 1–5); 716 N-2; 718 N-1; 720 N

FIG. 7

800

| Sample Number (802) | Phase (Degrees) (804) | Adjusted Phase (Degrees) (806) | Nearest Predetermined Phase Value (Degrees) (808) | Actual Phase Difference (Degrees) (810) | Phase Difference Indicated By Symbol (Degrees) (812) |
|---|---|---|---|---|---|
| 1 | 10 | | | | |
| 2 | 20 | 0 | 0 | 10 | 0 |
| 3 | 30 | 0 | 0 | 10 | 0 |
| 4 | 40 | 0 | 0 | 10 | 0 |
| 5 | 50 | 0 | 0 | 10 | 0 |
| 6 | 60 | 0 | 0 | 10 | 0 |
| 7 | 110 | 40 | 0 | 50 | 0 |

814 (samples 1–4); 816 N-2; 818 N-1; 820 N

FIG. 8

900

| Sample Number (902) | Phase (Degrees) (904) | Adjusted Phase (Degrees) (906) | Nearest Predetermined Phase Value (Degrees) (908) | Actual Phase Difference (Degrees) (910) | Phase Difference Indicated By Symbol (Degrees) (912) |
|---|---|---|---|---|---|
| 1 | 90 | | | | |
| 2 | 90 | 90 | 90 | 0 | 0 |
| 3 | 90 | 90 | 90 | 0 | 0 |
| 4 | 90 | 90 | 90 | 0 | 0 |
| 5 | 90 | 90 | 90 | 0 | 0 |
| 6 | 60 | 60 | 90 | -30 | 0 |
| 7 | 120 | 116 | 90 | 60 | 0 |

914 (samples 1–4); 916 N-2; 918 N-1; 920 N

FIG. 9

DIGITAL AUDIO PROCESSING SYSTEM AND METHOD

CLAIM OF PRIORITY

This application is a Divisional Application of, and claims priority from, U.S. patent application Ser. No. 12/895,170, filed on Sep. 30, 2010; which is a Divisional Application of U.S. Pat. No. 7,831,001, filed on Dec. 19, 2006; each of which are hereby incorporated by reference in their entireties.

FIELD OF THE DISCLOSURE

The present disclosure is generally related to systems and methods of processing digital audio signals.

BACKGROUND

Digital audio processing systems can be used for applications such as television, radio, cellular and Internet protocol communications. Audio data can be encoded in a modulated signal using any of a variety of modulation techniques. Some methods of audio data encoding require the use of a phase lock loop to extract the audio data from encoded signals. In addition, audio data can be extracted from some data signals by determining a phase difference between sequential samples of the data signal. However, phase lock loop circuits can be costly or unreliable, and noisy signals can interfere with recovery of phase differences encoded in an audio signal. Therefore, there is a need for an improved digital audio processing system and method.

BRIEF DESCRIPTION OF THE DRAWINGS

FIG. 7 is a table depicting a particular illustrative embodiment of an operation of a digital audio processing system;

FIG. 8 is a table depicting a particular illustrative embodiment of an operation of a digital audio processing system;

FIG. 9 is a table depicting a particular illustrative embodiment of an operation of a digital audio processing system.

DETAILED DESCRIPTION

Figure 1:
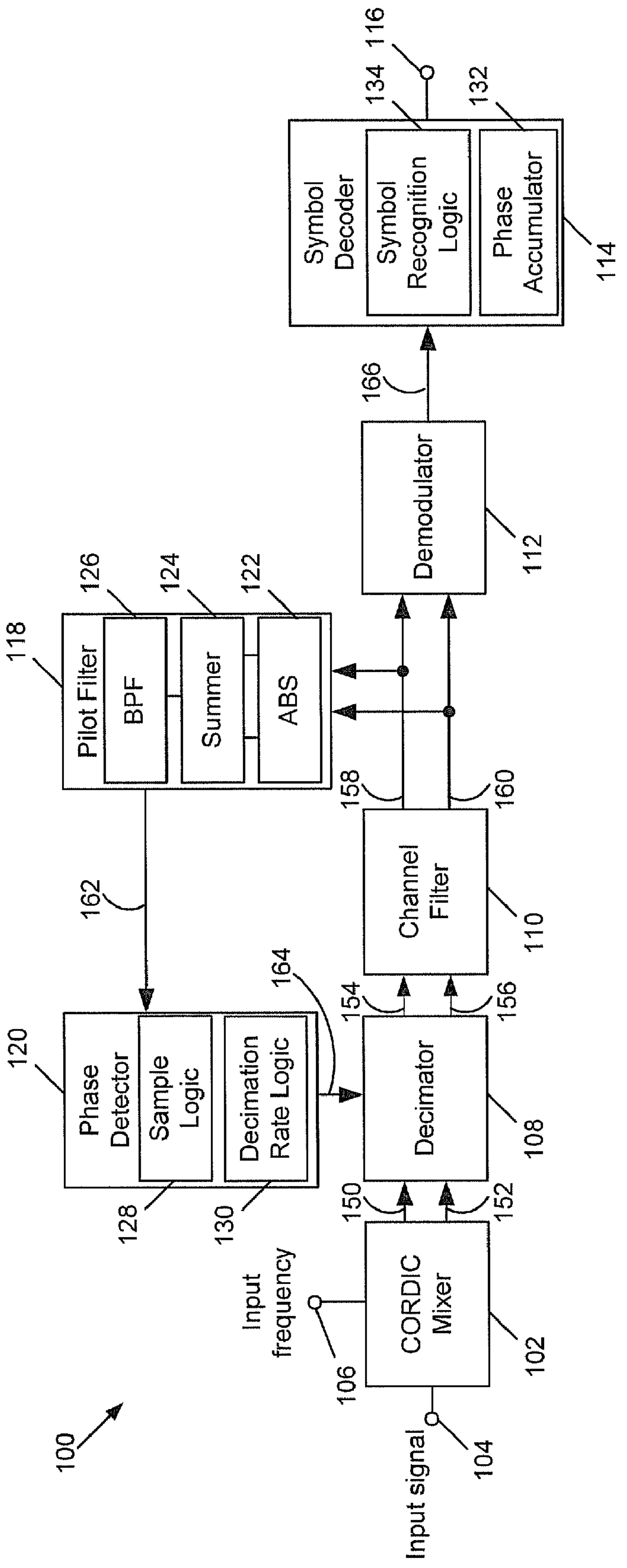
FIG. 1 is a block diagram of a particular illustrative embodiment of a digital audio processing system.

In a particular embodiment, a digital audio processing system is disclosed. The system includes a decimator to perform variable rate decimation of an input signal, a filter path providing a filtered output of the decimator, the filtered output including a pilot signal having a pilot signal frequency. The filtered output has a sample rate that is approximately an integer multiple of the pilot signal frequency. The integer multiple is not less than two and not more than sixty-four. The system also includes a phase detector responsive to the filter path and including logic to sample the filtered output. An output of the phase detector is coupled to the decimator to adjust a decimation rate of the decimator based on the pilot signal.

In another embodiment, a digital audio processing system is disclosed that includes a decimator to perform variable rate decimation of an input signal, a filter path providing a filtered output of the decimator, and a phase detector responsive to the filter path and including logic to sample the filtered output at a sample rate. The phase detector also includes decimation rate control logic to determine a decimation rate command based on a comparison of a sample of the filtered output to zero. An output of the phase detector is coupled to the decimator to adjust the decimation rate of the decimator.

In another embodiment, a digital audio processing system is disclosed that includes an input to receive a phase component of a signal. The system also includes symbol recognition logic to adjust a sample of the phase component using an offset value, to map the adjusted sample to a nearest predetermined phase value of a plurality of predetermined phase values, and to determine a symbol using a difference between the nearest predetermined phase value and a prior nearest predetermined phase value of the plurality of predetermined phase values. The prior nearest predetermined phase value corresponds to a prior sample of the phase component and the offset value is based on a detected error of the prior sample. The system also includes an output to provide a signal that indicates the symbol.

In another embodiment, a digital signal processing system is disclosed that includes an input to receive a phase signal, where a first sample of the phase signal and a second sample of the phase signal are offset by less than 45 degrees, a third sample of the phase signal is offset by less than 45 degrees from the second sample but offset by greater than 45 degrees from the first sample, and each sample of a plurality of samples of the phase signal received at the input prior to the first sample is offset from a prior sample of the plurality of samples by a substantially constant phase drift. The system also includes symbol recognition logic to determine a symbol that indicates a phase difference with respect to the second sample and the third sample, where the symbol is at least partially determined based on the substantially constant phase drift and a phase difference between the second sample and the third sample.

In another embodiment, a digital audio processing method is disclosed. The method includes receiving first data corresponding to a first signal sampled at a first sample rate, decimating the first data to provide a second signal sampled at a second sample rate, and recovering a pilot signal from the second signal. The method also includes evaluating the pilot signal to determine an error value, where the error value is based on a comparison of a sample of the pilot signal to zero. The method also includes adjusting the second sample rate based on the error value.

In an embodiment, a method includes decimating an input signal to produce first output. The method includes filtering the first output to recover a pilot signal. The method includes evaluating the pilot signal to determine an error value. The error value is based on a comparison of a sample of the pilot signal to zero. The method also includes adjusting the sample rate based on the error value.

In an embodiment, a method includes decimating a first inphase signal and a first quadrature signal at a sample rate with a decimator to output a second inphase signal and a second quadrature signal. The method includes recovering a pilot signal from the second inphase signal and the second quadrature signal with a pilot filter. The method includes evaluating the pilot signal to determine an error value with a phase detector. The error value is based on a comparison of a sample of the pilot signal to zero. The method also includes adjusting the sample rate at the decimator based on the error value.

Referring to FIG. 1, a particular illustrative embodiment of a digital audio processing system is depicted and generally designated 100. The system 100 includes a Coordinate Rotation Digital Computer (CORDIC) mixer 102 that receives an input signal at a first input 104 and receives an input frequency at a second input 106. A decimator 108 is coupled to the CORDIC mixer 102 to perform variable rate decimation of an Inphase signal (I) output 150 and a Quadrature signal (Q) output 152 of the CORDIC mixer 102. A channel filter 110 filters an I' output 154 and a Q' output 156 of the decimator 108 to generate an I" output 158 and a Q" output 160 to a demodulator stage 112. The demodulator stage 112 demodulates the received I" output 158 and Q" output 160 and provides a phase output 166 to a symbol decoder 114. The demodulator stage 112 transforms each sample of the I" output 158 and the Q" output 160 to magnitude and phase values and indicates a differential phase at the phase output 166. The symbol decoder 114 includes symbol recognition logic 134 and a phase accumulator 132 to decode a symbol from the received phase output 166 of the demodulator 112. The symbol decoder 114 is coupled to an output 116 to provide an indication of the decoded symbol.

A pilot filter 118 is coupled to the channel filter 110 to receive and process the I" output 158 and the Q" output 160 of the channel filter 110. In a particular embodiment, the pilot filter 118 includes an absolute value circuit (ABS) 122, a summer 124 coupled to an output of the ABS 122, and a bandpass filter (BPF) 126 coupled to an output of the summer 124.

A phase detector 120 is coupled to the pilot filter 118 to receive an output 162 from the pilot filter 118. In a particular embodiment, the phase detector 120 includes sample logic 128 to sample the output 162 and decimation rate control logic 130 to determine a decimation rate command based on a comparison of a sample of the output 162 to zero. The decimation rate is expressed as a sample rate at a decimator input divided by the output sample rate. The phase detector 120 provides an output 164 to the decimator 108 so that the decimation rate at the decimator 108 can be adjusted based on the decimation rate command.

In a particular embodiment, the input signal can be a modulated digital signal that is received at the first input 104 of the CORDIC mixer 102. The CORDIC mixer 102 mixes the input signal substantially to baseband using the input frequency 106. In a particular embodiment, the input signal is mixed via an iterative process that generates the I output 150 and Q output 152 of the CORDIC mixer 102. In another particular embodiment, the CORDIC mixer 102 operates without performing a multiplication function and without using a local oscillator.

In a particular embodiment, the I signal 150 and the Q signal 152 output by the CORDIC mixer 102 include a pilot signal that has a pilot signal frequency. In a particular embodiment, the input signal received at the first input 104 can include a Near Instantaneous Companded Audio Multiplex (NICAM) signal and the pilot signal frequency can equal approximately 364 kHz. The pilot filter 118 can recover the NICAM pilot signal by receiving the I" signal 158 and Q" signal 160 of the channel filter 110 and generating the absolute value of each of the I" signal 158 and the Q" signal 160 at the ABS circuit 122. The absolute values generated at the ABS circuit 122 are then added together at the summer 124. The output of the summer is then filtered by the bandpass filter 126 to recover the pilot signal. The resultant signal 162 is then output to the phase detector 120. Generally, the signal 162 can exhibit any sampling rate. In a particular embodiment, a sampling rate of the signal 162 can be approximately an integer multiple of the pilot signal frequency. In a particular embodiment, the integer multiple is not less than two and not more than sixty-four. In a particular embodiment, the pilot signal is a NICAM pilot signal, and the integer multiple is four. In another particular embodiment, the pilot signal is a Broadcast Television Systems Committee (BTSC) signal, and the integer multiple is thirty-two.

In a particular embodiment, the phase detector 120 includes sample logic 128 that samples the signal 162 received from the pilot filter 118. In a specific embodiment, the sample logic 128 can sample the signal 162 at a rate approximately equal to the pilot signal frequency. In another specific embodiment, the sample logic 128 can sample the signal 162 at a rate approximately equal to twice the pilot signal frequency and a sign of every other sample can be inverted. In another specific embodiment, the sample logic 128 can also sample the pilot signal at one or more quarter-wavelengths of the pilot signal to determine a strength of the pilot signal. The value of the pilot signal sampled at the phase detector 120 by the sample logic 128 can be used to control the decimation rate of the decimator 108 in order to establish and maintain phase lock to the pilot signal. In a particular embodiment, the decimator 108 can be a variable rate, fractional decimator that enables adjustment of the decimation rate without interrupting an output of the decimator 108.

Figure 2:
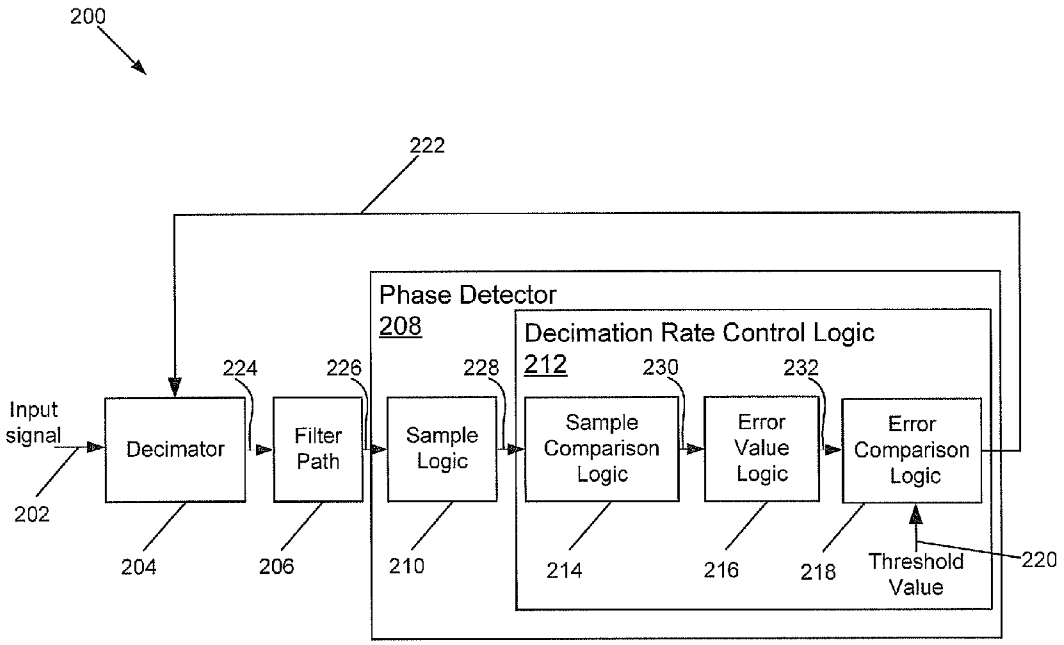
FIG. 2 is a block diagram of a particular illustrative embodiment of a digital audio processing system.

Referring to FIG. 2, a particular illustrative embodiment of a digital audio processing system is depicted and generally designated 200. The system 200 receives an input signal 202 at a decimator 204. The decimator 204 generates an output signal 224 by performing variable rate decimation of the input signal 202. A filter path 206 receives the signal 224 and provides a filtered output signal 226. A phase detector 208 is responsive to the filter path 206. In a particular embodiment, the phase detector 208 can include sample logic 210 to sample the filtered output signal 226 at a sample rate that is approximately an integer multiple of the pilot signal frequency and to provide a sample output 228. The phase detector 208 can also include decimation rate control logic 212 to determine a decimation rate command signal 222 based on a comparison of the sample output 228 to zero. The decimation rate command signal 222 is received at the decimator 204 to adjust a decimation rate based on the decimation rate command.

In a particular embodiment, the system 200 can operate as a phase lock loop. The input signal 202 can include a pilot signal that is recovered at the filter path 206 and sampled by the sample logic 210. The decimation rate control logic 212 can determine if the sample demonstrates a phase offset or phase drift and provide an output signal 222 to the decimator 204 to acquire and maintain phase lock to the pilot signal. In a particular embodiment, the decimation rate control logic 212 can periodically compare a sample to zero, and determine if the decimation rate is too fast or too slow based on the value of the sample and on the difference between the prior sample that is compared to zero.

In a particular embodiment, the decimation rate control logic 212 can include sample comparison logic 214 to compare samples 228 of the filtered input signal 226 to predetermined values. Error value logic 216 can receive an output 230 of the sample comparison logic 214 and compute an error value at least partially based on the value and slope of the input signal samples 228 as determined by the sample comparison logic 214 and provided via the output 230. Error comparison logic 218 can receive an error signal output 232 from the error value logic 216, compare the error value to a threshold value 220, and generate the decimation rate command signal 222.

In a particular embodiment, the decimation rate command 222 output by the phase detector 208 to the decimator 204 can be a command to decrease the decimation rate when an error associated with a sample 228 of the filtered output 226 has a positive value. Similarly, the decimation rate command 222 can be a command to increase the decimation rate when an error associated with the sample 228 of the filtered output 226 has a negative value. In particular embodiments, the command to increase the decimation rate can have a positive value, and the command to decrease the decimation rate can have a negative value.

In a particular embodiment, the phase detector 208 can be a second-order phase detector and decimation rate control logic 212 can determine the decimation rate command further based on a comparison of an error associated with a sample of the filtered output 226 to a prior sample of the filtered output 226. In an illustrative embodiment, the sample comparison logic 214 can compare a sample of the filtered output 226 to zero and can further compare the sample of the filtered output 226 to a prior sample of the filtered output 226. The error value logic 216 can receive an output 230 of the sample comparison logic 214 and compute the error value 232 based on a weighted sum of the current sample of the filtered output 226 and the difference between the last sample of the filtered output 226 and the current sample of the filtered output 226. The weighted sum can be filtered and the resultant error value output 232 can be received at the error comparison logic 218.

Figure 3:
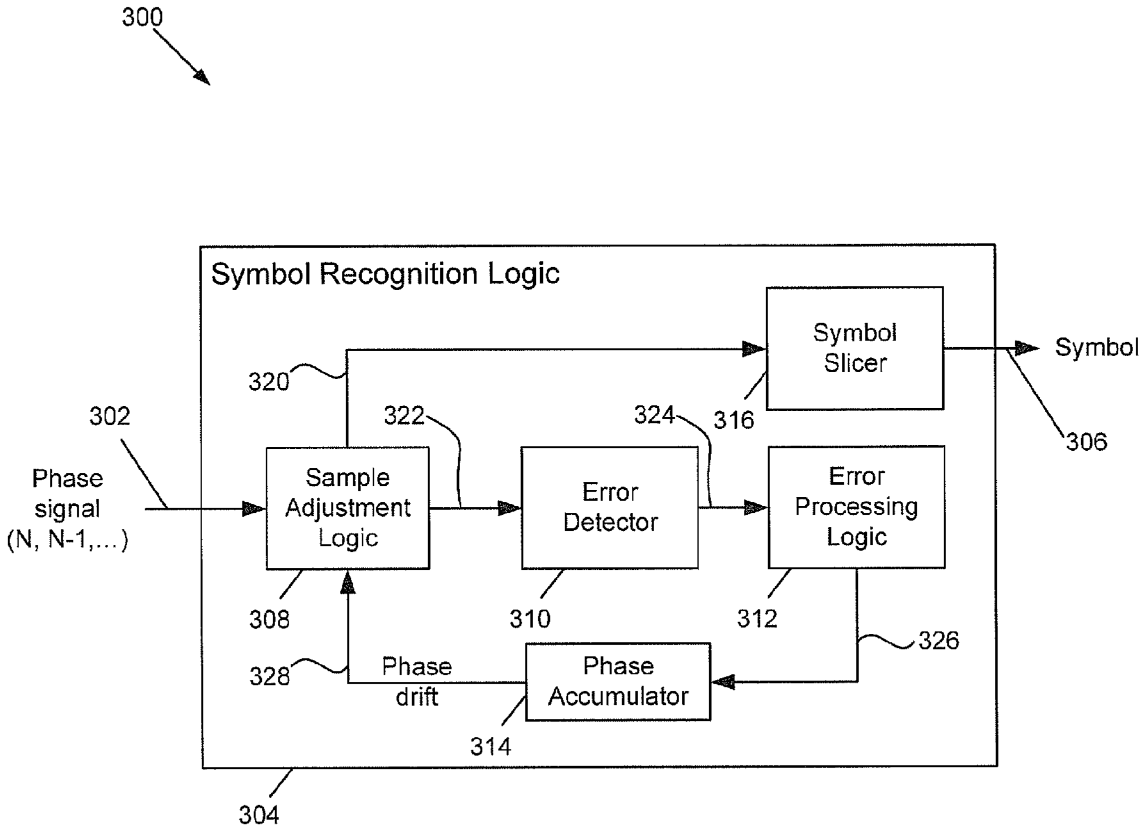
FIG. 3 is a block diagram of a particular illustrative embodiment of a digital audio processing system.

Referring to FIG. 3, a particular illustrative embodiment of a digital audio processing system is depicted and generally designated 300. The system 300 receives samples of a phase signal input 302. The phase signal 302 is received at symbol recognition logic 304. The symbol recognition logic 304 includes sample adjustment logic 308 to provide an adjusted sample output 322 by adjusting a sample of the phase signal 302 using an offset value 328 representing a phase drift. The adjusted sample 322 is received at an error detector 310. The error detector 310 can map the adjusted sample 322 to a nearest predetermined phase value of a plurality of predetermined phase values. The error detector 310 can output an error value 324 based on a difference between the adjusted sample and the nearest predetermined phase value.

An adjusted sample output 320 of the sample adjustment logic 308 is received at a symbol slicer 316. The symbol slicer 316 determines a symbol using a difference between the nearest predetermined phase value corresponding to one adjusted sample of the sample output 320 and a prior nearest predetermined phase value corresponding to the preceding adjusted sample of the sample output 320. The symbol determined by the symbol slicer 316 is indicated via an output 306.

The error detector 310 can provide an output 324 to error processing logic 312 to update the offset value 328 that is received at the sample adjustment logic 308. The output 324 can be based on a difference between the adjusted sample 322 and the nearest predetermined phase value corresponding to the adjusted sample 322. In a specific embodiment, the error processing logic 312 can filter the output 324 of the error detector 310 using a low-pass filter (LPF), integrate an output of the LPF at an integrator, and output a weighted average of the output of the LPF and the output of the integrator. An output 326 of the error processing logic 312 updates a value stored at a phase accumulator 314. The phase accumulator 314 accumulates output values received from the error processing logic 312, wraps the resulting offset value at 2*PI and provides the offset value 328 to the sample adjustment logic 308.

In a particular embodiment, the input signal 302 to the system 300 can include NICAM phase data. The symbol recognition logic 304 can adjust each sample of the input signal 302 by the offset value 328 received for the phase accumulator 314 that represents a phase drift. In an illustrative embodiment, the offset value can compensate for a nearly constant phase drift that can be introduced by an imperfect mixing of a received signal to baseband. The symbol slicer 316 can receive a first adjusted sample N−1 and determine a nearest predetermined phase value to the first adjusted sample N-1 from a plurality of predetermined phase values that can include 0 degrees, 90 degrees, 180 degrees, and 270 degrees. The symbol slicer 316 can receive a next adjusted sample N and determine a symbol from a predetermined set of symbols based on a phase difference between the nearest predetermined phase value for N-1 and the adjusted phase value of N. In a particular illustrative embodiment, the input signal includes NICAM phase data and the predetermined set of symbols indicates a phase difference of 0 degrees, 90 degrees, 180 degrees, or 270 degrees between the sample N and the prior sample N−1.

Figure 4:
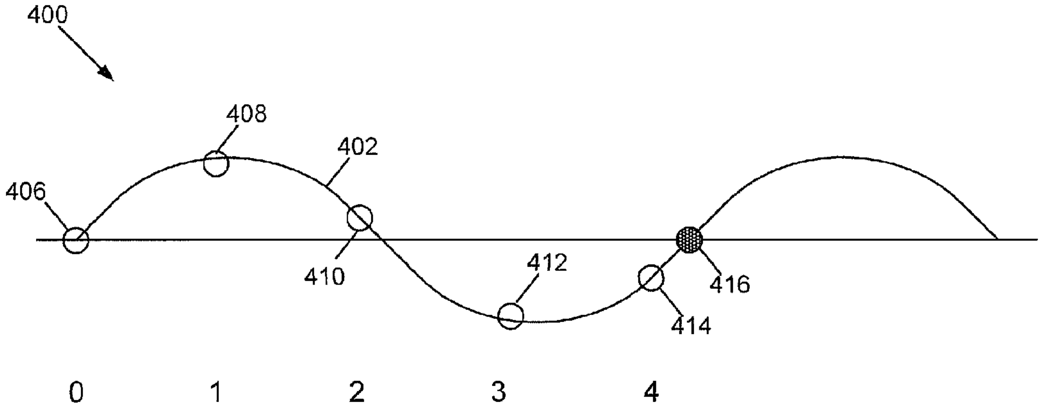
FIG. 4 is a graphical diagram depicting a particular illustrative embodiment of an operation of a digital audio processing system.

Referring to FIG. 4, a graphical diagram depicting a particular illustrative embodiment of an operation of a digital audio processing system is shown and generally designated 400. An illustrative signal 402 is received and sampled at a substantially predetermined sampling rate. In the particular illustrative embodiment of FIG. 4, the sample rate is approximately four times the frequency of the signal 402. Samples 406, 408, 410, 412 and 414 indicate sample values of the signal 402. The value of the signal 402 at sample 406 is approximately zero, and when phase lock to the signal 402 is achieved the value of the sample 414 will also equal zero, illustrated as phase lock sample 416. However, as depicted in the illustrative embodiment of FIG. 4, sample 414 is less than zero, indicating that the signal 402 is being sampled at too fast of a sample rate. Phase lock will be achieved when the sample rate is reduced so that every fourth sample 406, 414 has a zero value.

Figure 5:
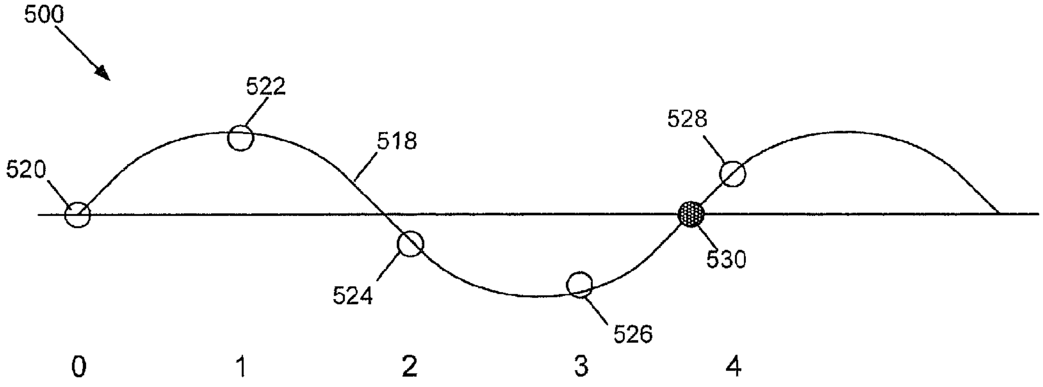
FIG. 5 is a graphical diagram depicting a particular illustrative embodiment of an operation of a digital audio processing system.

Referring to FIG. 5, a graphical diagram depicting a particular illustrative embodiment of an operation of a digital audio processing system is shown and generally designated 500. Samples 520, 522, 524, 526 and 528 of a signal 518 demonstrate that the signal 518 is sampled at too slow of a sample rate. In particular, sample 520 and sample 528 will both have a zero value when phase lock is acquired and maintained. However, sample 528 is greater than zero, indicating that the sample rate should be increased until sample 528 coincides with the illustrated phase lock sample 530.

Figure 6:
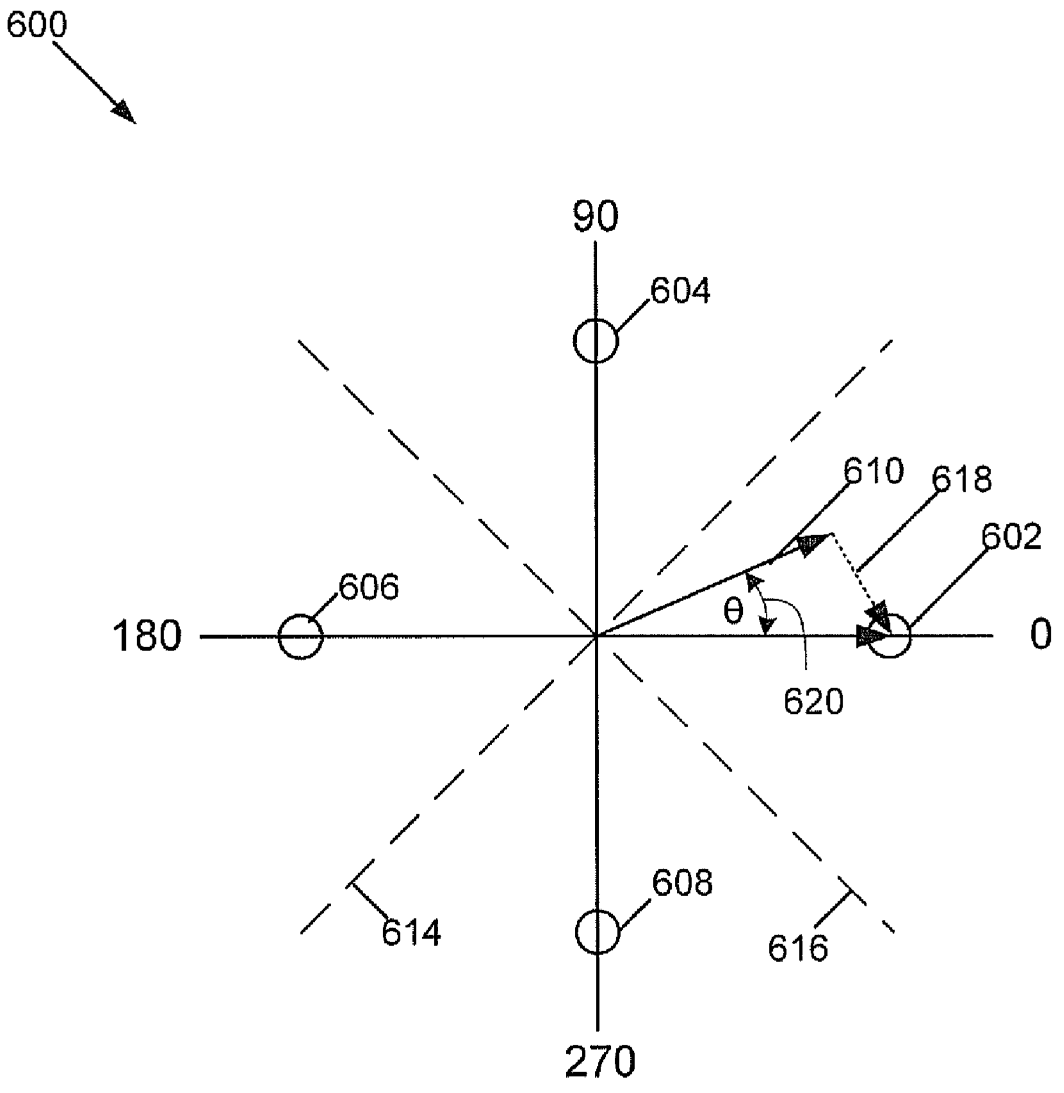
FIG. 6 is a graphical diagram depicting a particular illustrative embodiment of an operation of a digital audio processing system.

Referring to FIG. 6, a graphical diagram depicting a particular illustrative embodiment of an operation of a digital audio processing system is shown and generally designated 600. A set of predetermined phase values 602, 604, 606 and 608 are indicated at phase values of 0 degrees, 90 degrees, 180 degrees, and 270 degrees, respectively. A first phase boundary 614 and a second phase boundary 616 together bisect each quadrant and graphically indicate which of the predetermined phase values 602, 604, 606 and 608 is nearest to a received phase value. A vector 610 depicts a received phase value having angle θ 620. Because the endpoint of the phase value vector 610 is less than the phase boundary 614 and greater than the phase boundary 616, the nearest predetermined phase value to vector 610 is the predetermined phase value 602 at 0 degrees. Likewise, a received phase value with an endpoint greater than the first phase boundary 614 and the second phase boundary 616 can be mapped to the predetermined phase value 604 at 90 degrees, a received phase value with an endpoint greater than the first phase boundary 614 and less than the second phase boundary 616 can be mapped to the predetermined phase value 606 at 180 degrees, and a received phase value that is less than the first phase boundary 614 and the second phase boundary 616 can be mapped to the predetermined phase value 608 at 270 degrees. An error vector 618 graphically depicts the error of the vector 610 as an offset from the nearest predetermined phase value 602.

In some particular embodiments, the symbol recognition logic 134 of FIG. 1 or the symbol recognition logic 304 of FIG. 3 can operate substantially in accordance with the embodiment depicted in FIG. 7. In FIG. 7, a table depicting a particular illustrative embodiment of an operation of a digital audio processing system is shown and generally designated 700. The table 700 depicts samples received at an input to a digital processing system characterized by values in rows 714 corresponding to a plurality of samples, followed by a row 716 of values corresponding to a sample N−2, a row 718 corresponding to a sample N−1, and a row 720 corresponding to a sample N. A Sample Number column 702 provides illustrative, non-limiting sample designation numbers in accordance with a particular illustrative embodiment. A Phase column 704 indicates a phase value received at the input for each of the plurality of samples at rows 714 and samples at rows 716, 718 and 720. An Adjusted Phase column 706 indicates an adjusted phase value for each sample based on errors of prior samples. A Nearest Predetermined Phase Value column 708 indicates which one of a plurality of predetermined phase values is closest to the adjusted phase value of each sample. An Actual Phase Difference column 710 indicates the difference between the phase of each sample and the phase of the preceding sample. A Phase Difference Indicated By Symbol column 712 indicates the phase difference between each sample and the preceding sample that is determined by symbol recognition logic at least partially based on a substantially constant phase drift and a phase difference between samples.

Because each of the plurality of samples in rows 714 has a phase of 0, each sample of the plurality of samples is offset from a prior sample of the plurality of samples by a substantially constant phase drift of 0 degrees. Similarly, sample N-2 has a phase value of zero and is offset from the prior sample by 0 degrees. At row 718, sample N-1 has a phase of 30 degrees, and because the phase drift of preceding samples is 0, sample N-1 has an adjusted phase of 30 degrees and a nearest predetermined phase value of 0 degrees. Although the actual phase difference between sample N-1 and N-2 is 30 degrees, because sample N-1 is mapped to 0 degrees, the phase difference indicated by the symbol is 0 degrees.

At row 720, sample N has a phase of 60 degrees. Because the prior sample N-1 has a phase value 30 degrees away from the nearest predetermined phase value of 0 degrees, the error of sample N-1 is filtered and applied to sample N in the non-limiting, illustrative embodiment of FIG. 7 as a 4 degree adjustment, resulting in an adjusted phase value of 56 degrees. The nearest predetermined phase value to 56 degrees is 90 degrees, and although the actual phase difference between samples N and N-1 is only 30 degrees, the symbol output indicates a phase difference of 90 degrees.

In some particular embodiments, the symbol recognition logic 134 of FIG. 1 or the symbol recognition logic 304 of FIG. 3 can operate substantially in accordance with the embodiment depicted in FIG. 8. In FIG. 8, a table depicting a particular illustrative embodiment of an operation of a digital audio processing system is shown and generally designated 800. The table 800 depicts samples received at an input to a digital processing system characterized by values in rows 814 corresponding to a plurality of samples, followed by a row 816 of values corresponding to a sample N-2, a row 818 corresponding to a sample N-1, and a row 820 corresponding to a sample N. A Sample Number column 802 provides illustrative, non-limiting sample designation numbers in accordance with a particular illustrative embodiment. A Phase column 804 indicates a phase value received at the input for each of the plurality of samples at rows 814 and samples at rows 816, 818 and 820. An Adjusted Phase column 806 indicates an adjusted phase value for each sample based on errors of prior samples. A Nearest Predetermined Phase Value column 808 indicates which one of a plurality of predetermined phase values is closest to the adjusted phase value of each sample. An Actual Phase Difference column 810 indicates the difference between the phase of each sample and the phase of the preceding sample. A Phase Difference Indicated By Symbol column 812 indicates the phase difference between each sample and the preceding sample that is determined by symbol recognition logic at least partially based on a substantially constant phase drift and a phase difference between samples.

Each of the plurality of samples in rows 814 is offset from the prior sample by a substantially constant phase drift of 10 degrees. The samples depicted in rows 814 each have an adjusted phase of 0 degrees after adjustment for phase drift. Similarly, sample N-2 has a phase value of 50 degrees, offset from the prior sample by 10 degrees, and has an adjusted phase value of 0 degrees. At row 818, sample N-1 has a phase of 60 degrees, offset from the prior sample by 10 degrees, and has an adjusted phase value of 0 degrees. At row 820, sample N has a phase of 110 degrees. Because of the phase drift of prior samples, sample N has an adjusted phase value of 40 degrees. The nearest predetermined phase value corresponding to the 40 degree adjusted phase of sample N is 0 degrees, and because sample N-1 also had a nearest predetermined phase difference of 0 degrees, a 0 degree phase difference is indicated by the symbol, although the actual phase difference between sample N-1 and sample N is closer to 90 degrees than to 0 degrees.

In some particular embodiments, the symbol recognition logic 134 of FIG. 1 or the symbol recognition logic 304 of FIG. 3 can operate substantially in accordance with the embodiment depicted in FIG. 9. In FIG. 9, a table depicting a particular illustrative embodiment of an operation of a digital audio processing system is shown and generally designated 900. The table 900 depicts samples received at an input to a digital processing system characterized by values in rows 914 corresponding to a plurality of samples followed by a row 916 of values corresponding to a sample N-2, a row 918 corresponding to a sample N-1, and a row 920 corresponding to a sample N. A Sample Number column 902 provides illustrative, non-limiting sample designation numbers in accordance with a particular illustrative embodiment. A Phase column 904 indicates a phase value received at the input for each of the plurality of samples at rows 914 and samples at rows 916, 918 and 920. An Adjusted Phase column 906 indicates an adjusted phase value for each sample based on errors of prior samples. A Nearest Predetermined Phase Value column 908 indicates which one of a plurality of predetermined phase values is closest to the adjusted phase value of each sample. An Actual Phase Difference column 910 indicates the difference between the phase of each sample and the phase of the preceding sample. A Phase Difference Indicated By Symbol column 912 indicates the phase difference between each sample and the preceding sample that is determined by symbol recognition logic at least partially based on a substantially constant phase drift and a phase difference between samples.

Each of the plurality of samples in rows 914 is offset from the prior sample by a substantially constant phase drift of 0 degrees. The samples depicted in rows 914 each have an adjusted phase of 90 degrees after adjustment for phase drift. Similarly, sample N-2 has a phase value of 90 degrees, an adjusted phase value of 90 degrees, and is offset from the prior sample by 0 degrees. At row 918, sample N-1 has a phase of 60 degrees and is offset from the prior sample by −30 degrees. Because the phase drift of prior samples is zero, sample N-1 has an adjusted phase value of 60 degrees, which is mapped to the nearest predetermined phase value of 90 degrees. At row 920, sample N has a phase of 120 degrees. Because of the 30 degree error of sample N-1, sample N has an adjusted phase value of 116 degrees in the non-limiting, illustrative embodiment depicted in FIG. 9. The nearest predetermined phase value corresponding to the 116 degree adjusted phase of sample N is 90 degrees, and because sample N-1 also had a nearest predetermined phase difference of 90 degrees, a 0 degree phase difference is indicated by the symbol, although the actual phase difference between sample N-1 and sample N is 60 degrees, which is closer to 90 degrees than to 0 degrees.

Figure 10:
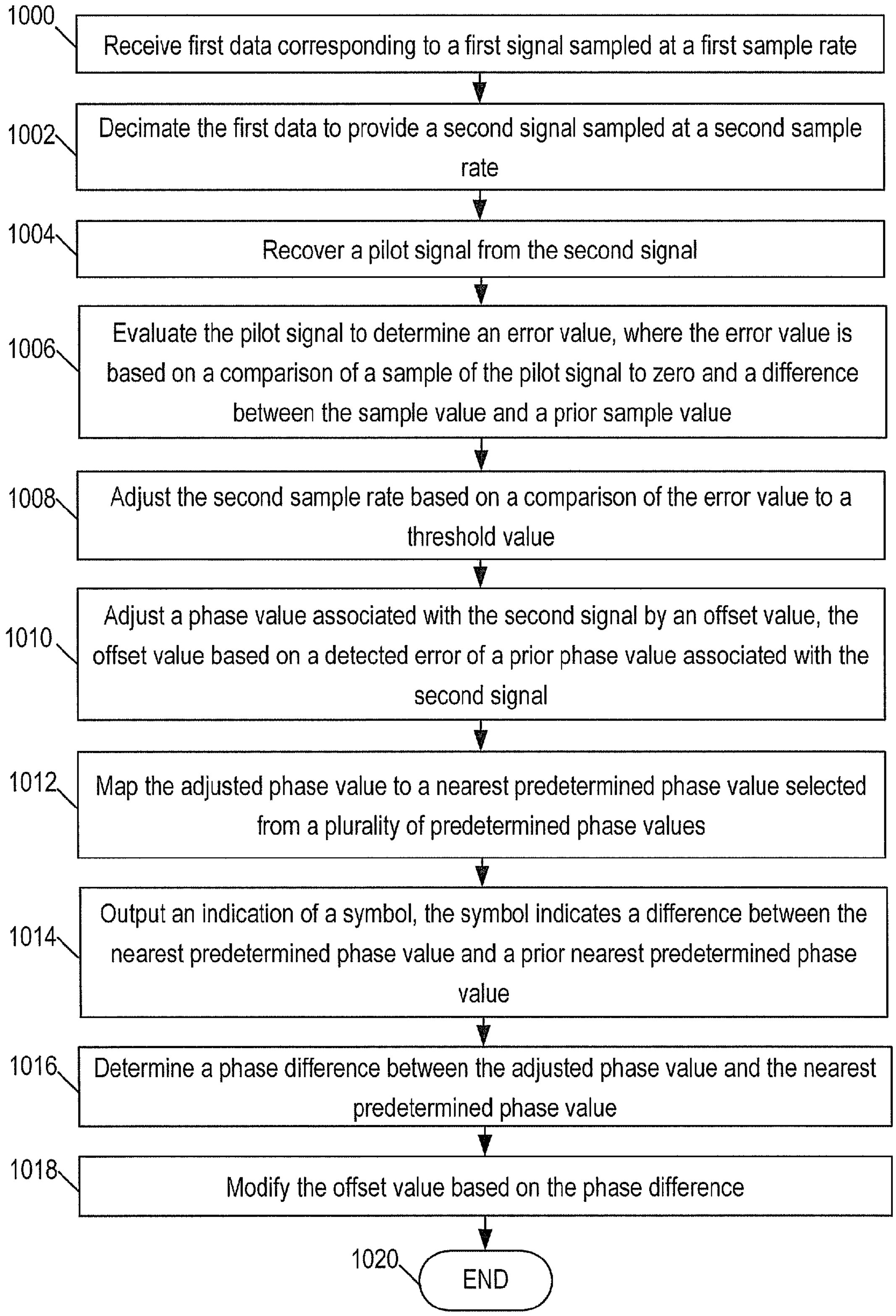
FIG. 10 is a flow chart depicting a particular illustrative embodiment of a digital audio processing method.

Referring to FIG. 10, a flow chart depicting a particular illustrative embodiment of a digital audio processing method is shown. First data corresponding to a first signal sampled at a first sample rate is received, at 1000. The first data is decimated to provide a second signal sampled at a second sample rate, at 1002. A pilot signal is recovered from the second signal, at 1004. The pilot signal is evaluated to determine an error value, where the error value is based on a comparison of a sample of the pilot signal to zero and a difference between the sample value and a prior sample value, at 1006. In a particular embodiment, error value can be based only on the comparison of the sample to zero and not based on the difference between the sample value and the prior sample value. In another embodiment, the comparison of the sample to zero is performed on every Nth sample of the pilot signal, wherein N is four or thirty-two. The second sample rate is adjusted based on a comparison of the error value to a threshold value, at 1008.

In a particular embodiment, a phase value associated with the second signal is adjusted by an offset value, the offset value based on a detected error of a prior phase value associated with the second signal, at 1010. The adjusted phase value is mapped to a nearest predetermined phase value selected from a plurality of predetermined phase values, at 1012. In a particular illustrative embodiment, the plurality of predetermined phase values includes 0 degrees, 90 degrees, 180 degrees, and 270 degrees. An indication of a symbol is output, the symbol indicating a difference between the nearest predetermined phase value and a prior nearest predetermined phase value, at 1014. In a particular illustrative embodiment, the symbol can be a NICAM symbol that indicates a phase difference of 0 degrees, 90 degrees, 180 degrees, or 270 degrees between phase values. A phase difference between the adjusted phase value and the nearest predetermined phase value is determined, at 1016. The offset value is modified based on the phase difference at 1018. The method terminates at 1020.

While specific systems and components of systems have been shown, it should be understood that many alternatives are available for such systems and components. In a particular illustrative embodiment, for example, a digital audio processing system may include hardware, software, firmware, or any combination thereof to perform functions and methods of operation as described. It should be understood that particular embodiments may be practiced solely by a processor executing processor instructions and accessing a processor readable memory, or in combination with hardware, firmware, software, or any combination thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A digital audio processing system comprising:

an input to receive a phase component of a signal;

symbol recognition logic to adjust a sample of the phase component using an offset value, to map the adjusted sample to a nearest predetermined phase value of a plurality of predetermined phase values, and to determine a symbol using a difference between the nearest predetermined phase value and a prior nearest predetermined phase value of the plurality of predetermined phase values, the prior nearest predetermined phase value corresponding to a prior sample of the phase component of the signal, wherein the offset value is based on a detected error of the prior sample of the phase component of the signal; and an output to provide a second signal that indicates the symbol.

2. The digital audio processing system of claim 1, wherein the plurality of predetermined phase values includes zero degrees, ninety degrees, one hundred eighty degrees, and two hundred seventy degrees.

3. The digital audio processing system of claim 1, wherein the symbol indicates a phase difference of zero degrees, ninety degrees, one hundred eighty degrees, or two hundred seventy degrees between the sample and the prior sample.

4. The digital audio processing system of claim 1, wherein the symbol is a Near Instantaneous Companded Audio Multiplex (NICAM) symbol.

5. The digital audio processing system of claim 1, further comprising a phase accumulator to provide the offset value.

6. The digital audio processing system of claim 5, wherein the symbol recognition logic includes logic to update a value stored at the phase accumulator based on a difference between the adjusted sample and the nearest predetermined phase value corresponding to the sample.

7. The digital audio processing system of claim 1, wherein the offset value represents phase drift.

8. The digital audio processing system of claim 1, wherein a symbol slicer of the symbol recognition logic sends the symbol to the input.

9. The digital audio processing system of claim 8, wherein the symbol slicer determines the symbol.

10. The digital signal processing system of claim 1, wherein an error detector of the symbol recognition logic maps the adjusted sample to the nearest predetermined phase value of the plurality of predetermined phase values.

11. A method comprising:

receiving a phase signal input at symbol recognition logic;

adjusting, via the symbol recognition logic, a sample of the phase signal input to produce an adjusted sample of the phase signal input using an offset value based on detected errors of a closest prior sample and other prior samples of the phase signal input;

mapping the adjusted sample to a nearest predetermined phase value of a plurality of predetermined phase values; and determining, via the symbol recognition logic, a symbol based on a difference between the nearest predetermined phase value and a prior nearest predetermined phase value of the closest prior sample.

12. The method of claim 11, further comprising outputting the symbol via an output.

13. The method of claim 11, wherein the plurality of predetermined phase values includes zero degrees, ninety degrees, one hundred eighty degrees, and two hundred seventy degrees.

14. The digital audio processing system of claim 1, wherein the symbol is a Near Instantaneous Companded Audio Multiplex (NICAM) symbol.

15. The method of claim 11, wherein the symbol indicates a phase difference of zero degrees, ninety degrees, one hundred eighty degrees, or two hundred seventy degrees between the sample and the closest prior sample.

16. The method of claim 11, further comprising determining the offset value.

17. The method of claim 16, wherein determining the offset value comprises:

mapping the adjusted sample to the nearest predetermined phase value of the plurality of predetermined phase values to produce a first output;

filtering the first output with a low-pass filter;

integrating a second output of the low-pass filter with an integrator to generate a third output;

outputting a weighted average of the second output and the third output to produce a fourth output; and updating the offset value at a phase accumulator based on the fourth output.

18. The method of claim 11, wherein an error slicer of the symbol recognition logic determines the symbol.

19. A digital signal processing system, comprising:

an input to receive a phase signal, wherein a first sample of the phase signal and a second sample of the phase signal are offset by less than forty-five degrees, a third sample of the phase signal is offset by less than forty-five degrees from the second sample but offset by greater than forty-five degrees from the first sample, and each sample of a plurality of samples of the phase signal received at the input prior to the first sample is offset from a prior sample of the plurality of samples by a substantially constant phase drift amount; and symbol recognition logic to determine a symbol that indicates a phase difference with respect to the second sample and the third sample, wherein the symbol is at least partially determined based on the substantially constant phase drift amount and a phase difference between the second sample and the third sample.

20. The digital signal processing system of claim 19, wherein the symbol indicates a ninety degree phase difference when the substantially constant phase drift amount is approximately zero.

* * * * *